United States Patent
Hara (10) Patent No.: US 9,703,736 B2
(45) Date of Patent: Jul. 11, 2017

(54) DATA TRANSMISSION APPARATUS, COMMUNICATION CONTROL METHOD, AND COMMUNICATION CONTROL PROGRAM

(71) Applicant: Koutarou Hara, Nagoya (JP)

(72) Inventor: Koutarou Hara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 14/417,359

(22) PCT Filed: Oct. 19, 2012

(86) PCT No.: PCT/JP2012/077164
§ 371 (c)(1),
(2) Date: Jan. 26, 2015

(87) PCT Pub. No.: WO2014/020779
PCT Pub. Date: Feb. 6, 2014

(65) Prior Publication Data
US 2015/0212958 A1    Jul. 30, 2015

(30) Foreign Application Priority Data

Aug. 3, 2012    (JP) .................................. 2012-172697

(51) Int. Cl.
*G06F 13/36*    (2006.01)
*G06F 21/00*    (2013.01)
(Continued)

(52) U.S. Cl.
CPC ........ *G06F 13/362* (2013.01); *G06F 13/4221* (2013.01); *H04L 12/40006* (2013.01);
(Continued)

(58) Field of Classification Search
CPC ........... G06F 19/00; G06F 21/00; G06F 13/36
See application file for complete search history.

(56) References Cited

U.S. PATENT DOCUMENTS 4,593,282 A * 6/1986 Acampora .............. H04L 12/64
370/447
6,760,789 B2 * 7/2004 Fujita ...................... G06F 13/28
709/212
(Continued)

FOREIGN PATENT DOCUMENTS

JP    H06-30472 A    2/1994
JP    H0684083 A    3/1994
(Continued)

OTHER PUBLICATIONS

"CAN bus" Jul. 31, 2012 Retreived from the Internet: <http://en.wikipedia.org/w/index.php?title=CAN-bus&oldid=505095513>.

*Primary Examiner* — Henry Tsai
*Assistant Examiner* — Christopher a Daley
(74) *Attorney, Agent, or Firm* — Oliff PLC (57) ABSTRACT

A data transmission apparatus includes an output unit, when outputting data on a bus, to determine whether to output the data on the bus based on a result of a communication arbitration performed with competing data to be output on the bus, using priority information attached to the data; a storage unit to have areas set, the areas having respective priorities set for the communication arbitration, and to store a group of data having the consecutive priority information attached, in the respective areas; and a distribution unit to write the data having a transmission request received, in one of the areas in the storage unit, based on the priority information attached to the data. The output unit prioritizes outputting the data on the bus, the data being stored in the one of the areas having a higher priority, among the data stored in the areas.

6 Claims, 10 Drawing Sheets

(51) Int. Cl.
    *H04L 12/46*       (2006.01)
    *G06F 13/362*      (2006.01)
    *H04L 12/64*       (2006.01)
    *H04L 12/40*       (2006.01)
    *H04L 12/413*      (2006.01)
    *H04L 12/863*      (2013.01)
    *G06F 13/42*       (2006.01)

(52) U.S. Cl.
    CPC .... *H04L 12/4015* (2013.01); *H04L 12/40032* (2013.01); *H04L 12/40163* (2013.01); *H04L 12/4135* (2013.01); *H04L 12/4625* (2013.01); *H04L 12/6418* (2013.01); *H04L 47/6215* (2013.01)

(56) References Cited

U.S. PATENT DOCUMENTS

| | | | |
|---|---|---|---|
| 6,970,921 | B1 | 11/2005 | Wang et al. |
| 7,130,912 | B2 * | 10/2006 | Nishikado ............... H04L 67/42 709/225 |
| 2002/0147865 | A1 | 10/2002 | Fujita et al. |
| 2003/0009271 | A1 * | 1/2003 | Akiyama ............... G06F 21/335 701/29.6 |
| 2003/0188013 | A1 | 10/2003 | Nishikado et al. |
| 2003/0200375 | A1 * | 10/2003 | Kawaguchi ......... G06F 13/4031 710/309 |
| 2004/0032235 | A1 | 2/2004 | Takei |
| 2007/0130265 | A1 | 6/2007 | Yano et al. |
| 2009/0083463 | A1 * | 3/2009 | Aue ................... H04L 12/40032 710/105 |
| 2011/0013522 | A1 * | 1/2011 | Kishigami ............... H04L 12/12 370/242 |
| 2011/0083161 | A1 * | 4/2011 | Ishida .................... H04L 12/40 726/2 |
| 2011/0320660 | A1 * | 12/2011 | Hara ...................... G06F 13/362 710/114 |
| 2012/0084482 | A1 * | 4/2012 | Yamanaka ............ G06F 13/385 710/305 |
| 2012/0102249 | A1 * | 4/2012 | Duroiu .................. G06F 13/362 710/110 |
| 2015/0003443 | A1 * | 1/2015 | Koenigseder ......... H04W 40/20 370/350 |

FOREIGN PATENT DOCUMENTS

| | | |
|---|---|---|
| JP | H07222257 A | 8/1995 |
| JP | H09200234 A | 7/1997 |
| JP | H09247192 A | 9/1997 |
| JP | H1013463 A | 1/1998 |
| JP | 2002208935 A | 7/2002 |
| JP | 2002-354000 A | 12/2002 |
| JP | 2003283556 A | 10/2003 |
| JP | 2003333888 A | 11/2003 |
| JP | 2007158926 A | 6/2007 |
| JP | 2009284085 A | 12/2009 |

* cited by examiner

DATA TRANSMISSION APPARATUS, COMMUNICATION CONTROL METHOD, AND COMMUNICATION CONTROL PROGRAM

TECHNICAL FIELD

The present invention relates to a data transmission apparatus, a communication control method, and a communication control program.

BACKGROUND ART

A network system has become popular that has a configuration where multiple processing units such as ECUs (Electronic Control Units) and the like are connected with a bus. The multiple ECUs in such a network system execute information processing allocated to the respective units, and are capable of outputting processed results on the bus to provide the results for the other ECUs. Also, in such a network system, a process called a "communication arbitration" may be executed to avoid the multiple ECUs outputting data on the bus at the same time. The communication arbitration is executed in a network system, for example, that executes communications based on a CAN (Controller Area Network). The communication arbitration in a CAN is executed under a rule where each ECU compares data transmitted by itself with a result obtained by monitoring bus states, and if the bus states are compliant with the data transmitted by itself, then the ECU determines that it wins the communication arbitration, and continues to output data.

Also, a system has been disclosed in which various ECUs are connected with a communication bus, and when the multiple ECUs attempt to transmit data in response to transmission requests, transmission data having a higher priority is prioritized to be written in a transmission buffer (see, for example, Patent Document 1).

Also, an apparatus has been disclosed that includes multiple buffer memories, stores digital information to be transmitted in one of the multiple buffer memories depending on types of the digital information to be transmitted, and sets transfer order depending on waiting numbers and priorities accompanying the data, which change along with the progress of the transmission process (see, for example, Patent Document 2).

RELATED-ART DOCUMENTS

Patent Documents

[Patent Document 1] Japanese Laid-open Patent Publication NO. 9-200234
[Patent Document 2] Japanese Laid-open Patent Publication NO. 7-222257

SUMMARY OF THE INVENTION

Problem to be Solved by Invention

However, the technologies described in Patent Documents 1 and 2 do not assume that data is output on a bus where a communication arbitration is executed, and hence, the following problem may arise.

In the system described in Patent Document 1, although it is stated that transmission data having a higher priority is prioritized to be written in the transmission buffer, this priority is not assumed to be that used for the communication arbitration. Also, even if this priority could be regarded as the same priority used for the communication arbitration, an inconvenient circumstance may arise where if first transmission data having a lower priority has been written in the transmission buffer, and after that, second transmission data having a higher priority is generated, then the first transmission data having the lower priority continues to lose communication arbitrations, and consequently, the second transmission data having the higher priority is forced to be kept in a state waiting for transmission in the transmission buffer (or in a memory area at the preceding stage).

Also, in Patent Document 2, the apparatus is described that sets transfer order depending on waiting numbers and priorities accompanying the data, which change along with the progress of the transmission process. However, similarly to Patent Document 1, this priority is not assumed to be that used for the communication arbitration. Also, even if this priority could be regarded as the same priority used for the communication arbitration, the workload of the apparatus relating to memory accesses and software processes may be excessive because the transfer order needs to be determined after having read all data in the multiple buffer memories allocated for the digital information to be transmitted depending on "types the digital information to be transmitted", which is irrelevant to the priority.

It is an object of at least one embodiment of the present invention to provide a data transmission apparatus and a communication control program that can prioritize outputting data on a bus that has a higher priority relating to the communication arbitration, without making the workload of the apparatus excessive.

Means to Solve the Problem

According to at least one embodiment of the present invention, a data transmission apparatus includes an output unit configured, when outputting data on a bus, to determine whether to output the data on the bus based on a result of a communication arbitration performed with competing data to be output on the bus, using priority information attached to the data to be output on the bus by the data transmission apparatus itself; a storage unit configured to have plural areas set, the areas having respective priorities set for the communication arbitration, and to store a group of data having the consecutive priority information attached, in the respective areas; and a distribution unit configured to write the data having a transmission request received, in one of the areas in the storage unit, base on the priority information attached to the data. The output unit prioritizes outputting the data on the bus, the data being stored in the one of the areas having a higher priority, among the data stored in the plural areas.

According to at least one embodiment of the present invention, the data transmission apparatus further includes a plurality of flag storage units configured to be provided corresponding to the plurality of areas set the storage unit, respectively. The distribution unit sets a flag in one of the flag storage units corresponding to one of the areas when data having the transmission request received is written in the one of the areas in the storage unit. The output unit prioritizes outputting the data stored in the one of the areas having the higher priority, among the areas in the storage unit corresponding to the flag storage unit having the flag set.

According to at least one embodiment of the present invention, in the data transmission apparatus, the output unit outputs, with a highest priority, data not having been output on the bus for a certain period of time, among the data stored in any one of the plural areas, regardless of the priority of the area storing the data.

According to at least one embodiment of the present invention, in the data transmission apparatus, the plural areas in the storage unit include an exceptional area dedicated for storing data not having been output on the bus for the certain period of time. The distribution unit determines the data not having been output on the bus, and moves the determined data to the exceptional area from a corresponding one of the other areas. The output unit outputs the data stored in the exceptional area with the highest priority on the bus.

According to at least one embodiment of the present invention, a data transmission method is executed by a data transmission apparatus configured, when outputting data on a bus, to determine whether to output the data on the bus based on a result of a communication arbitration performed with competing data to be output on the bus, using priority information attached to the data to be output on the bus by the data transmission apparatus itself. The method includes writing the data having a transmission request received, in a storage unit, based on the priority information attached to the data, the storage unit being configured to have a plurality of area set, the areas having respective priorities set for the communication arbitration, and to store a group of data having the consecutive priority information attached, in the respective areas; and prioritizing outputting the data on the bus, the data being stored in the one of the areas having priority higher priority, among the data stored in the plurality of areas.

According to at least one embodiment of the present invention, a non-transitory computer-readable recording medium has a program stored therein for causing a data transmission apparatus to execute a process, when outputting data on a bus, to determine whether to output the data on the bus based on a result of a communication arbitration performed with competing data to be output on the bus, using priority information attached to the data to be output on the bus by the data transmission apparatus itself. The process includes writing the data having a transmission request received, in a storage unit, base on the priority information attached to the data, the storage unit being configured to have a plurality of areas set, the areas having respective priorities set for the communication arbitration, and to store a group of data having the consecutive priority information attached, in the respective areas; and prioritizing outputting the data on the bus, the data being stored in the one of the areas having a higher priority equal or close to the high priority, among the data store in the plurality of areas.

Advantage of the Invention

According to at least one embodiment of the present invention, it is possible to provide a data transmission apparatus and a communication control program that can prioritize outputting data on a bus that has a higher priority relating to the communication arbitration, without making the workload of the apparatus excessive.

MODE FOR CARRYING OUT THE INVENTION

In the following, embodiments of the present invention will be described with reference to the drawings.

[Embodiments]

In the following, embodiments will be described for a data transmission apparatus, a communication control method, and a communication control program, with reference to the drawings.

Figure 1:
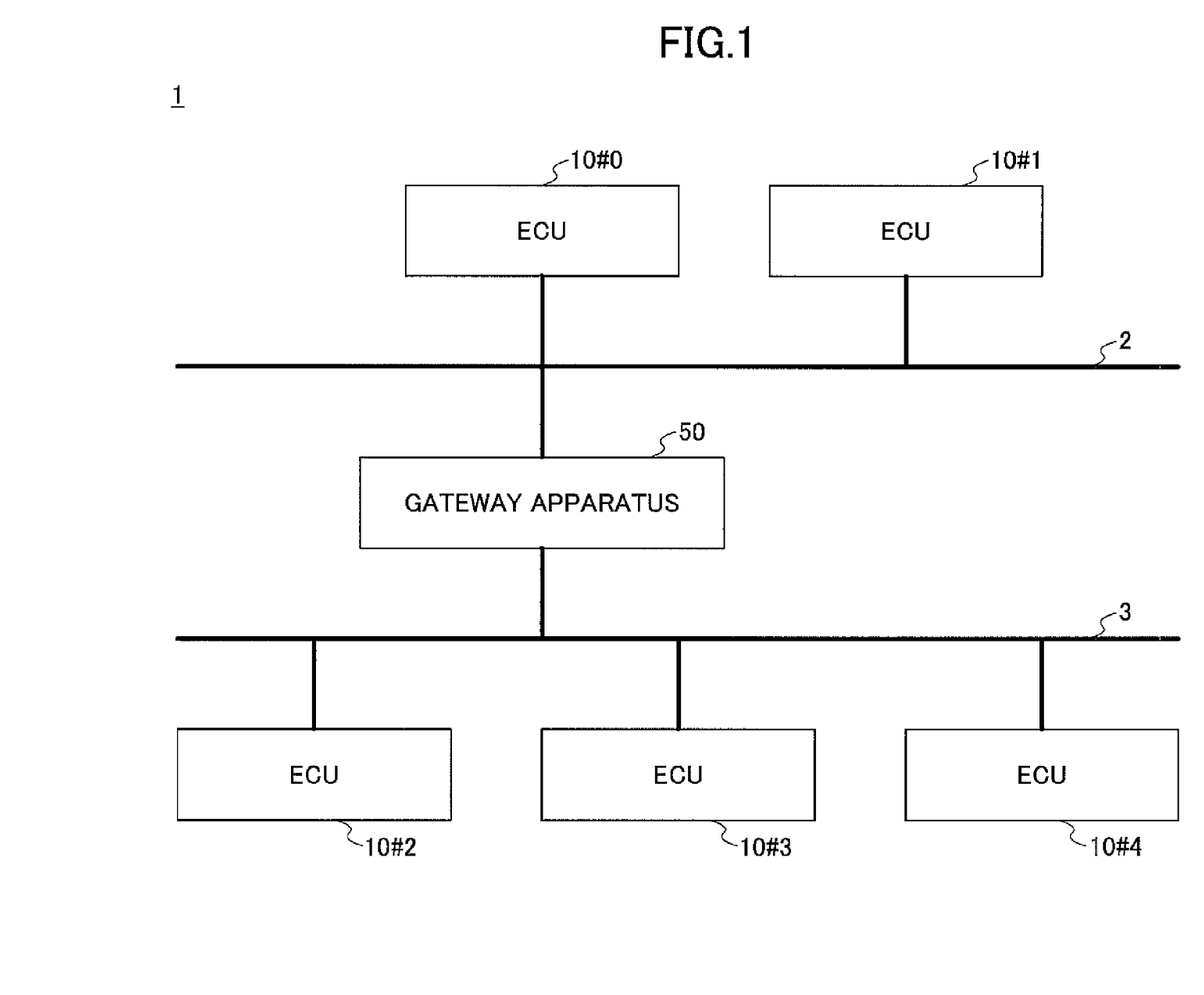
FIG. 1 illustrates a configuration example of a network system 1 that includes ECUs 10 according to an embodiment of the present invention.

FIG. 1 illustrates a configuration example of a network system 1 that includes ECUs 10 according to an embodiment of the present invention. The network system 1 includes ECUs 10#0 and 10#1 connected with a bus 2, ECUs 10#2, 10#3, and 10#4 connected with a bus 3, and a gateway apparatus 50 connected with the bus 2 and bus 3 for relaying between the bus 2 and bus 3. Note that a "data transmission apparatus" in claims corresponds to, for example, an "ECU".

On the bus 2 and the bus 3, for example, communications based on CANs are executed, and the ECUs can obtain data flowing on the buses. The bus 2 and the bus 3 are, for example, twisted pair cables, that transmit signals by a differential voltage method.

[ECU]

Figure 2:
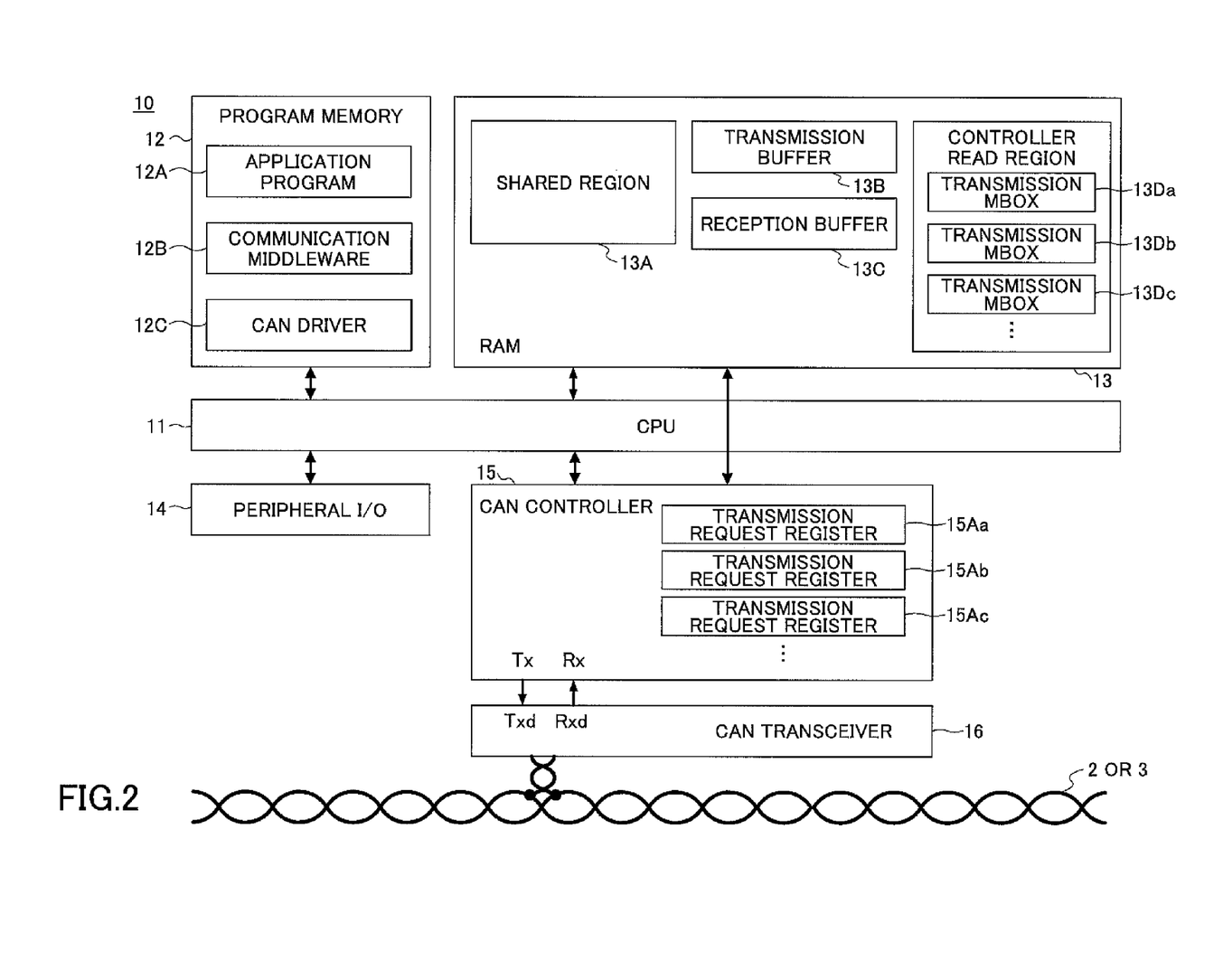
FIG. 2 illustrates a configuration example of an ECU 10.

FIG. 2 illustrates a configuration example of each of the ECUs 10 (simply referred to as an "ECU 10" when no distinction is required, below). It does not matter that some of the ECUs do not include a part of elements or functions in FIG. 2.

The ECU 10 includes, for example, a CPU (Central Processing Unit) 11, a program memory 12 that stores a program executed by the CPU 11, a RAM (Random Access Memory) 13 that functions as a working memory, a peripheral I/O 14 that is an interface with peripheral devices, a CAN controller 15, and a CAN transceiver 16.

The program memory 12 includes, for example, a ROM (Read-Only Memory), an EEPROM (Electrically Erasable and Programmable Read Only Memory), an HDD (Hard Disk Drive), and the like, in which programs such as an application program 12A, communication middleware 12B, a CAN driver 12C, and the like are stored.

The application program 12A is a program to execute information processing allocated to each of the ECUs. The application program 12A executes, for example, predetermined calculations periodically, and stores calculation results in a shared region 13A in the RAM 13.

The communication middleware 12B converts data stored in the shared region 13A into a format corresponding to the CAN driver 12C, writes the data in a transmission buffer 13B, and provides the data to the CAN driver 12C, for example, periodically or when receiving a request for processing from the application program 12A. The communication middleware 12B also converts data written in a reception buffer 13C into a format that can be interpreted by the application program 12A, stores the data in the shared region 13A, and provides the data to the application program 12A. The CAN driver 12C stores the data written in the transmission buffer 13B in one of multiple transmission MBOXes.

The RAM 13 has areas set that include the shared region 13A shared by the application program 12A and the communication middleware 12B, the transmission buffer 13B, the reception buffer 13C, and a controller read region 13D. The controller read region 13D includes the multiple transmission MBOXes (message boxes) 13Da, 13Db, 13Dc, and so on. The number of transmission MBOXes may be any number as long as it is plural. In the following description, it is assumed that three transmission MBOXes are set.

Detailed functions of the communication middleware 12B and the CAN driver 12C, and roles of the areas set in the RAM 13 will be described later.

The CAN controller 15 includes a protocol controller, a frequency divider that divides a CPU clock, and transmission control registers 15Aa, 15Ab, 15Ac, and so on. The transmission control registers correspond to the transmission MBOXes, respectively.

The CAN controller 15 transmits and receives various data with the bus 2 or the bus 3 via the CAN transceiver 16. Note that a processor that controls the CAN controller 15 may be the same as or different from the CPU 11.

When outputting data (a frame) on the bus, the CAN controller 15 converts the frame stored in one of the transmission MBOXes into a serial transmission signal by an NRZ (Non-Return-to-Zero) method, and outputs the converted signal to the CAN transceiver 16. The CAN controller 15 outputs a voltage at a low logic level for bits of "0 (dominant)" in the converted signal, and outputs a voltage at a high logic level for bits of "1 (recessive)".

The CAN transceiver 16 converts the transmission signal obtained from the CAN controller into a differential voltage to output it on the bus. Also, when obtaining data from the bus, the CAN transceiver 16 reads the differential voltage on the bus, and outputs a reception signal that is reshaped to be contained in a predetermined voltage range, to the CAN controller 15. A reception terminal Rx of the CAN controller 15 is attached with a comparator that compares a predetermined threshold voltage with the reception signal from the CAN transceiver 16 to generate digital data "1" or "0", and stores the data in the reception buffer 13C.

Figure 3:
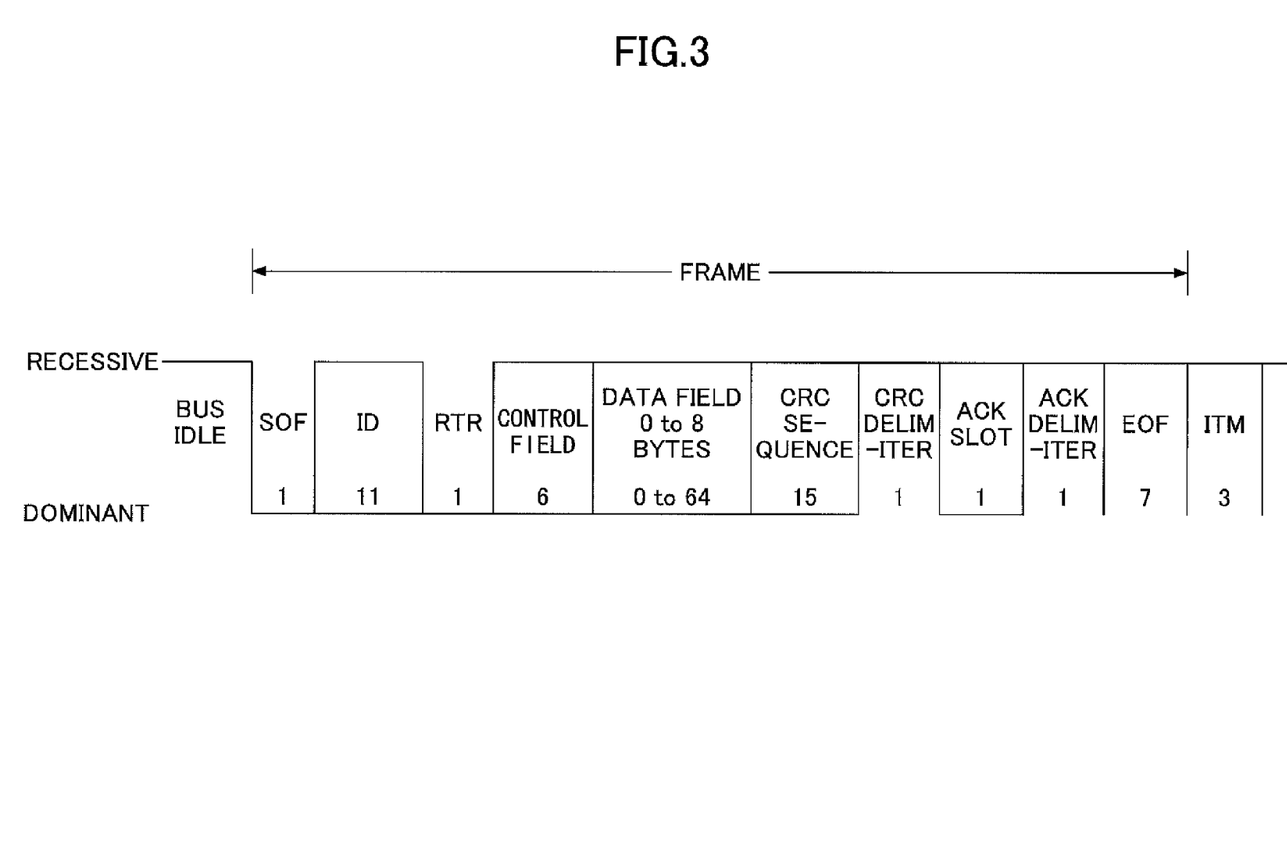
FIG. 3 illustrates a format example of a frame output on a bus by each ECU.

FIG. 3 illustrates a format example of a frame output on a bus by an ECU. The frame output for an occasion of transmission includes a start of the frame (SOF) that represents the start of the frame, a data identifier ID, a remote transmission request (RTR) to make distinction between a data frame and a remote frame, a control field that represents the number of bytes or the like of the data, a data field that is the data itself to be transferred, a CRC sequence for adding a CRC to check an error of the frame, an ACK slot and an ACK delimiter for receiving an indication (ACK) from a unit that has received a correct message, and an end of the frame (EOF) that represents the end of the frame.

On the bus 2 and bus 3, respectively, communication arbitrations are executed based on priorities represented by the IDs and RTRs. When frames are transmitted from multiple ECUs at the same time, each of the ECUs compares data transmitted by itself, with a result obtained by monitoring the bus state. Here, when the recessive and the dominant are transmitted by different ECUs at the same time, the dominant is prioritized, which makes the bus state dominant. At this moment, a node that has transmitted the recessive determines that the node loses the communication arbitration due to the difference between the data transmitted by itself and the bus state, and stops the transmission. Under such a principle, when multiple ECUs start transmitting frames at the same time, a node wins the communication arbitration that transmits the dominant while the other nodes transmits the recessive. Therefore, the smaller the ID of the frame is, the higher is the priority the frame has.

[Transmission Control]

In the following, transmission control by the communication middleware 12B, the CAN driver 12C, and the CAN controller 15 will be described in detail.

[Processes of Communication Middleware 12B and CAN Driver 12C]

In response to a request from the application program 12A, the communication middleware 12B stores data stored in the shared region 13A in the transmission buffer 13B. Here, the data stored in the shared region 13A has information that corresponds to the "ID" in the format of the frame (simply referred to as the "ID" below) assigned by the application program 12A. Assume that the ID takes an integer value between, for example, 1 and 10.

Figure 4:
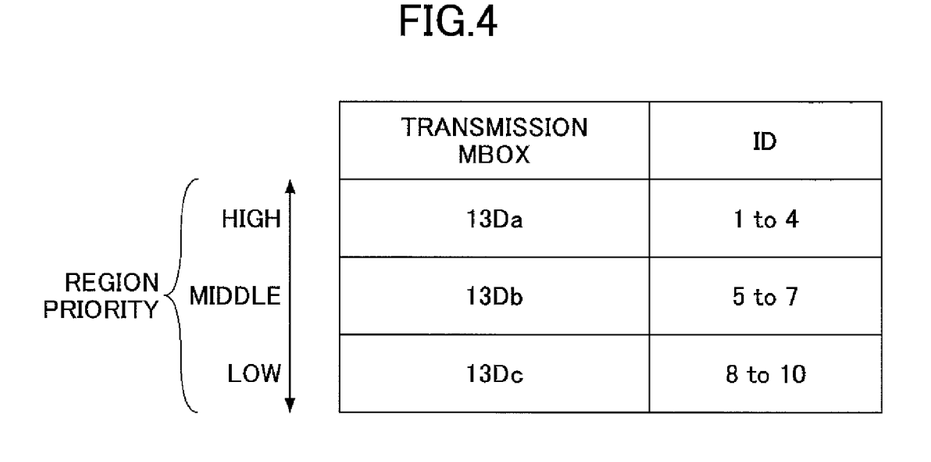
FIG. 4 illustrates an example of correspondence between transmission MBOXes and IDs.

The CAN driver 12C stores the data stored in the transmission buffer 13B in the transmission MBOX corresponding to the ID assigned for the data, while adding data required for the frame. FIG. 4 illustrates an example of correspondence between the transmission MBOXes and IDs. Each of the transmission MBOXes may store a frame of data, and if the transmission MBOX already has data stored, the CAN driver 12C does not store data in the transmission MBOX. As can be seen from the correspondence in FIG. 4, the transmission MBOX 13Da stores data having a higher priority in a communication arbitration. Also, the transmission MBOX 13Db stores data having a middle priority in the communication arbitration. Also, the transmission MBOX 13Dc stores data having a lower priority in the communication arbitration.

Furthermore, when having stored data in transmission MBOX 13Da, the CAN driver 12C sets the flag, for example, to "1" in the transmission request register 15Aa. Also, when having stored the data in the transmission MBOX 13Db, the CAN driver 12C sets the flag, for example, to "1" in the transmission request register 15Ab. When having stored the data in the transmission MBOX 13Dc, the CAN driver 12C sets the flag, for example, to "1" in the transmission request register 15Ac. Namely, the transmission request register 15Aa corresponds to the transmission MBOX 13Da the transmission request register 15Ab corresponds to the transmission MBOX 13Db and the transmission request register 15Ac corresponds to the transmission MBOX 13Dc.

Figure 5:
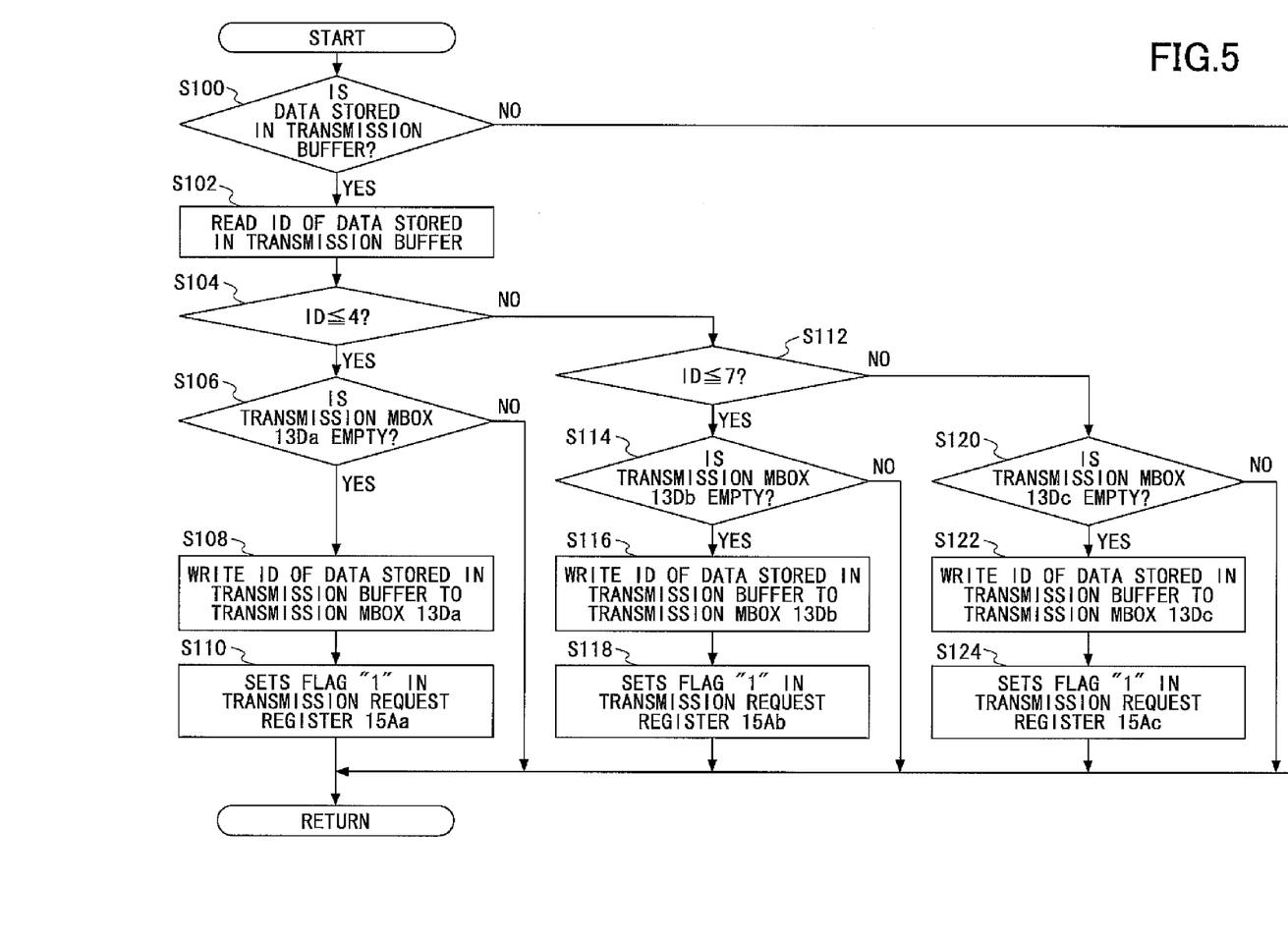
FIG. 5 illustrates an example of a flowchart of a process flow executed by a CAN driver 12C.

FIG. 5 illustrates an example of a flowchart of a process flow executed by the CAN driver 12C. The flowchart is repeatedly executed, for example, in predetermined cycles.

First, the CAN driver 12C determines whether data is stored in the transmission buffer 13B (Step S100). If data is not stored in the transmission buffer 13B, the CAN driver 12C ends a routine of the flowchart.

If data is stored in the transmission buffer 13B, the CAN driver 12C reads the ID of the data stored in the transmission buffer 13B (Step S102), and determines whether the ID is less than or equal to 4 (Step S104).

If the ID is less than or equal to 4, the CAN driver 12C determines whether the transmission MBOX 13Da is in an "empty" state (Step S106). If the transmission MBOX 13Da is in an "empty" state, the CAN driver 12C writes the data stored in the transmission buffer 13B in the transmission MBOX 13Da (Step S108), and sets the flag "1" in the transmission request register 15Aa (Step S110). If the transmission MBOX 13Da is not in an "empty" state, the CAN driver 12C ends the routine of the flowchart.

If the ID is over 4, the CAN driver 12C determines whether the ID is less than or equal to 7 (Step S112).

If the ID is less than or equal to 7, the CAN driver 12C determines whether the transmission MBOX 13Db is in an "empty" state (Step S114). If the transmission MBOX 13Db is in an "empty" state, the CAN driver 12C writes the data stored in the transmission buffer 13B in the transmission MBOX 13Db (Step S116), and sets the flag "1" in the transmission request register 15Ab (Step S118). If the transmission MBOX 13Db is not in an "empty" state, the CAN driver 12C ends the routine of the flowchart.

If the ID is over 7, the CAN driver 12C determines whether the transmission MBOX 13Dc is in an "empty" state (Step S120). If the transmission MBOX 13Dc is in an "empty" state, the CAN driver 12C writes the data stored in the transmission buffer 13B in the transmission MBOX 13Dc (Step S122), and sets the flag "1" in the transmission request register 15Ac (Step S124). If the transmission MBOX 13Dc is not in an "empty" state, the CAN driver 12C ends the routine of the flowchart.

[Process of CAN controller 15]

The CAN controller 15 outputs data (a frame) stored in a transmission MBOX that corresponds to a transmission request register having the flag "1" set, on the bus via the CAN transceiver 16. At this moment, if multiple transmission request registers have the flag "1" set, the CAN controller 15 attempts to output data stored in the transmission MBOX 13Da having the highest priority (actually outputs the data when winning the communication arbitration, the same in the following), then, attempts to output data stored in the transmission MBOX 13Db, and finally, attempts to output data stored in the transmission MBOX 13Dc, if the transmission MBOX 13Da, and the transmission MBOX 13Db have no data stored. When having completed to output the data stored in the transmission MBOXes on the bus, the CAN controller 15 clears the flag to zero in the corresponding transmission request register.

Figure 6:
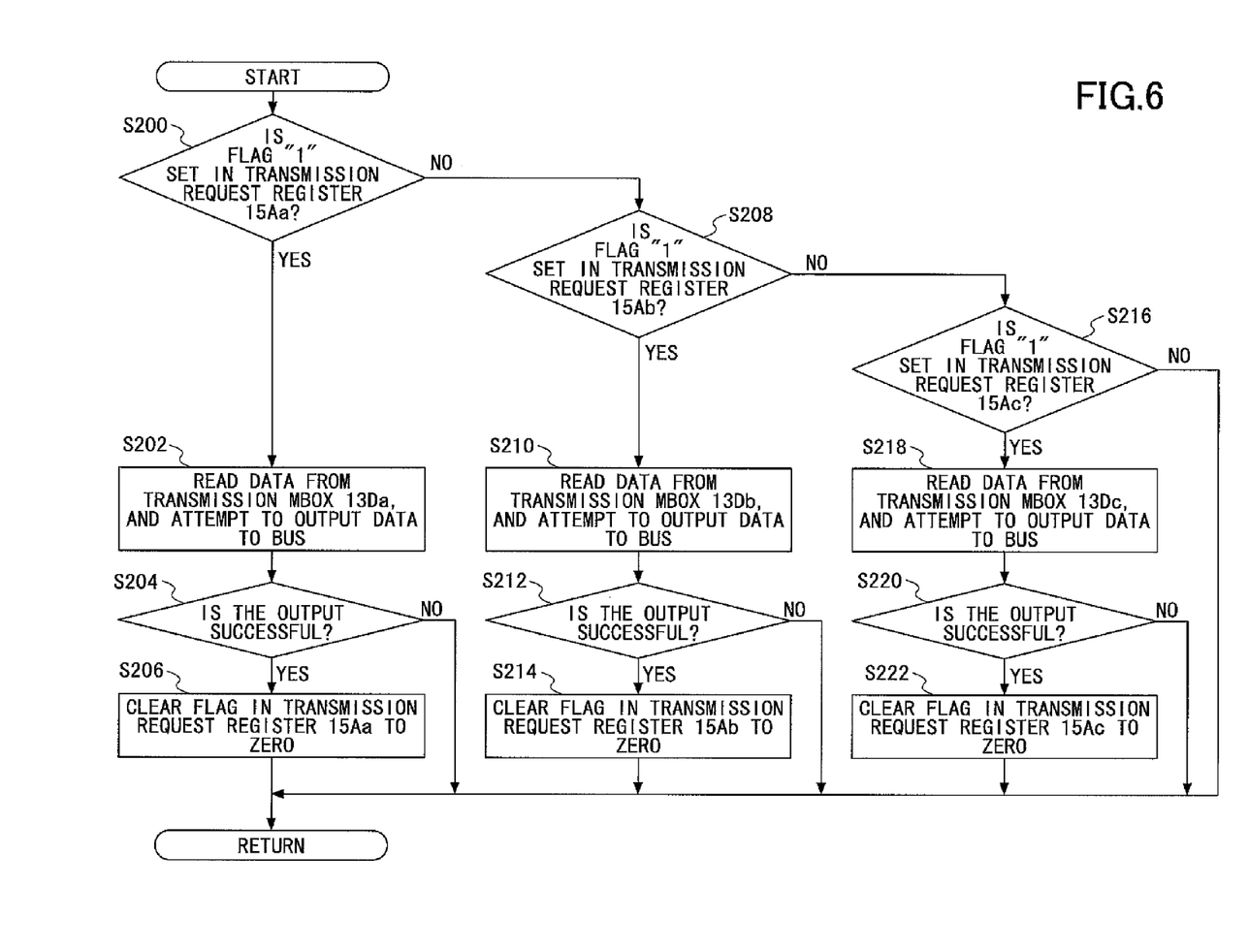
FIG. 6 is an example of a flowchart of a process flow executed by a CAN controller 15.

FIG. 6 is an example of a flowchart of a process flow executed by the CAN controller 15. The flowchart is repeatedly executed, for example, in predetermined cycles.

The CAN controller 15 first determines whether the flag "1" is set in the transmission request register 15Aa (Step S200).

If the flag "1" is set in the transmission request register 15Aa, the CAN controller 15 reads data from the transmission MBOX 13Da, and attempts to output the data on the bus (Step S202). Then, if winning the communication arbitration and being successful in outputting the data on the bus, the CAN controller 15 clears the flag to zero in the transmission request register 15Aa (Steps S204 and 206).

If the flag "1" is not set in the transmission request register 15Aa, the CAN controller 15 determines whether the flag "1" is set in the transmission request register 15Ab (Step S208).

If the flag "1" is set in the transmission request register 15Ab, the CAN controller 15 reads data from the transmission MBOX 13Db, and attempts to output the data on the bus (Step S210). Then, if winning the communication arbitration and being successful in outputting the data on the bus, the CAN controller 15 clears the flag to zero in the transmission request register 15Ab (Steps S212 and 214).

If the flag "1" is not set in the transmission request register 15Ab, the CAN controller 15 determines whether the flag "1" is set in the transmission request register 15Ac (Step S216).

If the flag "1" is set in the transmission request register 15Ac, the CAN controller 15 reads data from the transmission MBOX 13Dc, and attempts to output the data on the bus (Step S218). Then, if winning the communication arbitration and being successful in outputting the data on the bus, the CAN controller 15 clears the flag to zero in the transmission request register 15Ac (Steps S220 and 222).

By the above process, it is possible to prevent inconvenience from occurring where a low-priority frame continues to lose the communication arbitrations, and thus, a succeeding high-priority frame is kept in a wait state for a long time.

[Comparison with Another Configuration]

Figure 7:
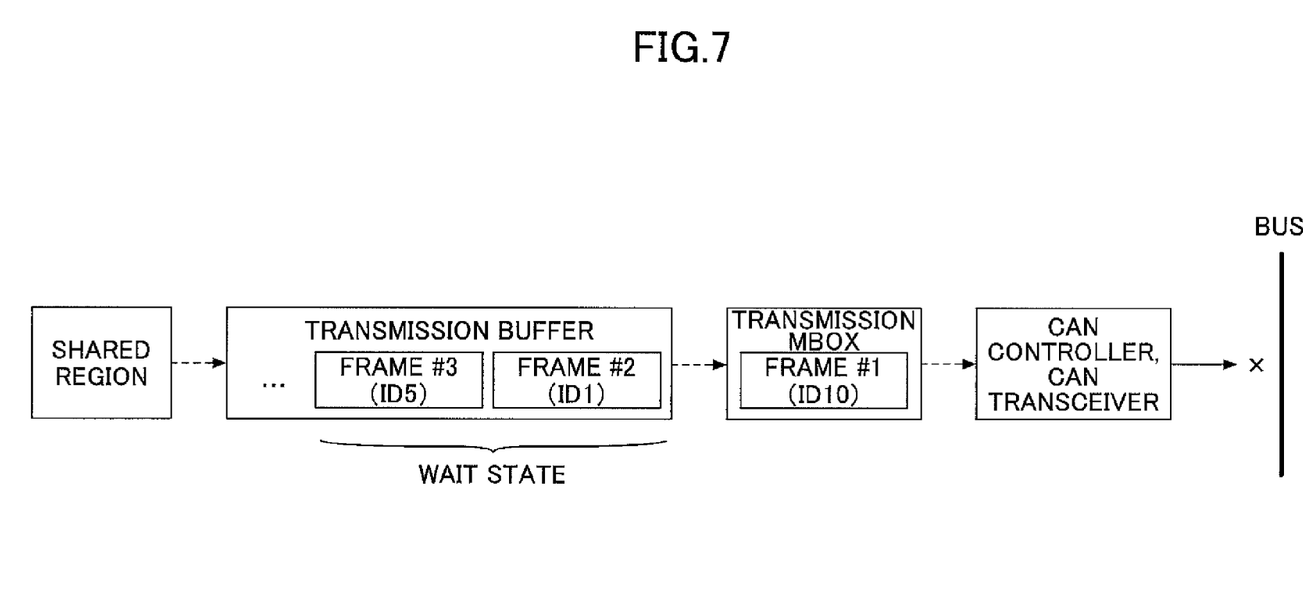
FIG. 7 is a diagram illustrating a state where inconvenience occurs in an ECU* as a comparison example that has only a single transmission MBOX set.

FIG. 7 is a diagram illustrating a state where inconvenience occurs in an ECU* as a comparison example that has only a single transmission MBOX set. The ECU* that has only a single transmission MBOX set, stores data stored in the transmission buffer in the transmission MBOX by FIFO (First In, First Out) basis, or in ascending order of IDs. However, it may naturally happen that data having a smaller ID is stored in the transmission buffer soon after data having a greater ID has been stored in the transmission MBOX. In this case, if the data stored earlier in the transmission MBOX continues to lose communication arbitrations, the succeeding data having a smaller ID is not stored in the transmission MBOX, and cannot help but be kept in a wait state. In the example of FIG. 7, in the ECU* as the comparison example, if the transmission requests come in order of frame #1 (ID10), frame #2 (ID1), and frame #3 (ID5), they would be output on the bus also in order of frame #1 (ID10), frame #2 (ID1), and frame #3 (ID5). However, since frame #1 (ID10) continues to lose the arbitrations, a likelihood is high for the succeeding frames to be kept in wait states regardless of the IDs.

Figure 8:
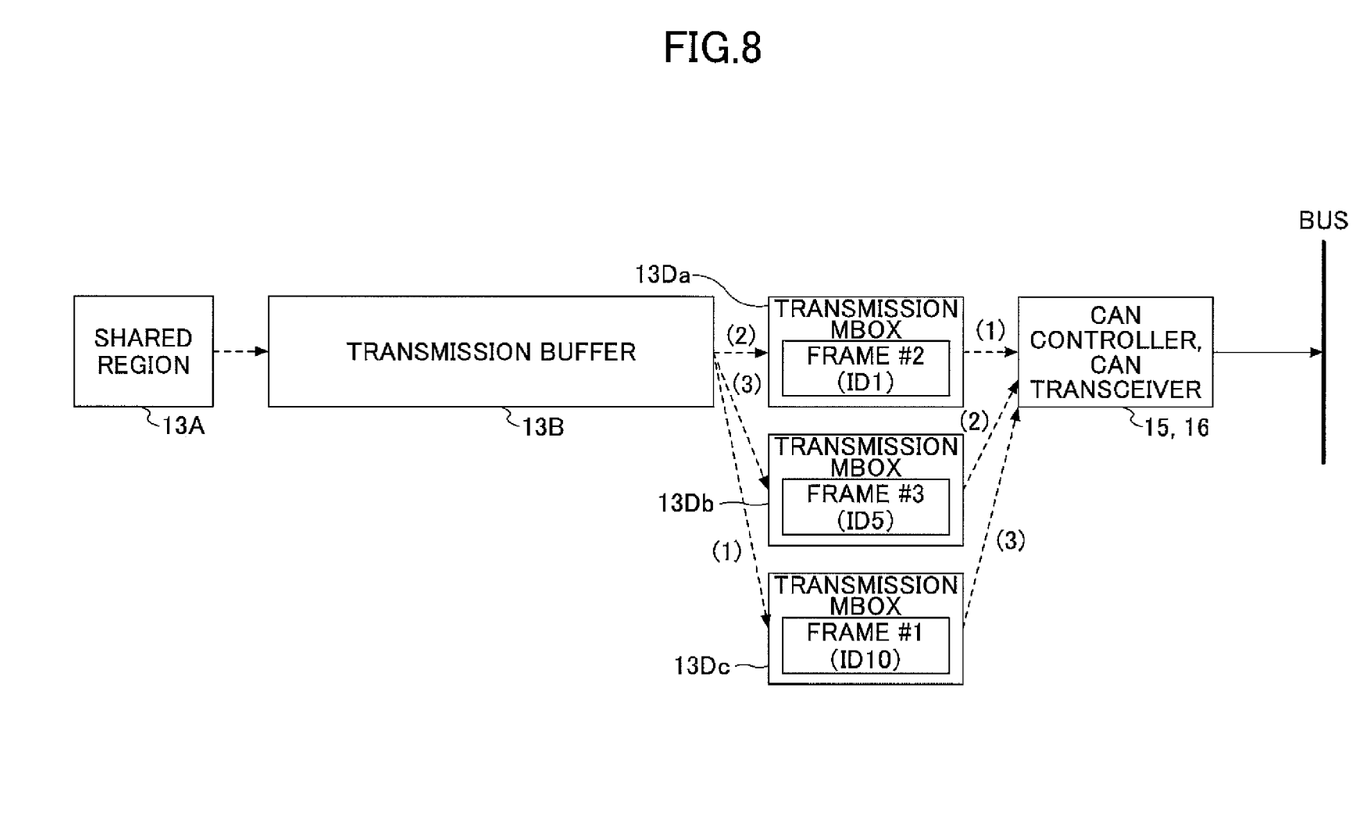
FIG. 8 is a diagram illustrating a state where an ECU 10 prioritizes outputting data on a bus that has a higher priority relating to the communication arbitration according to the embodiment.

In this regard, the ECU 10 in the present embodiment sets multiple transmission MBOXes corresponding to IDs, and prioritizes outputting data on the bus that has a smaller ID, namely, has a higher priority ID relating to a communication arbitration. Consequently, a likelihood is high for data having earlier attempted to be output on the bus, to win the communication arbitration, and it is possible to prevent the above inconvenience from occurring. FIG. 8 is a diagram illustrating a state where an ECU 10 prioritizes outputting data on the bus that has a higher priority relating to the communication arbitration on the bus according to the present embodiment. In the example of FIG. 8, if the transmission requests come in order of frame #1 (ID10), frame #2 (ID1), and frame #3 (ID5), they are output on the bus in order of frame #2 (ID1), frame #3 (ID5), and frame #1 (ID10); namely, frame #2 and frame #3 are highly likely to be output on the bus earlier than in the case of the ECU* as the comparison example.

Also, in the ECU 10 in the present embodiment, the CAN controller 15 can automatically determine which transmission MBOX should be selected from which data is read out to output on the bus depending on the value of the transmission request register. Therefore, it is not necessary to execute a process such as to refer to contents of all data stored in the transmission MBOXes for checking IDs. Consequently, it is possible to prioritize outputting data on the bus that has a higher priority relating to the communication arbitration, without making the workload of the CAN controller 15 excessive.

Also, since the ECU 10 in the present embodiment executes the process to prioritize outputting data on the bus that has a higher priority relating to the communication arbitration, at the communication middleware 12B layer or lower layers, the application program 12A does not need to be modified. Therefore, the cost of software modification is small when applying the present embodiment to an existing ECU or any other apparatuses.

SUMMARY

Thus, according to the ECU 10 in the present embodiment, it is possible to output data on a bus that has a higher priority relating to a communication arbitration, without making the workload excessive.

Although the embodiments to implement the present invention are described above, the present invention is not limited to the above embodiments, but various modifications and replacements can be made within the scope of the present invention.

Figure 9:
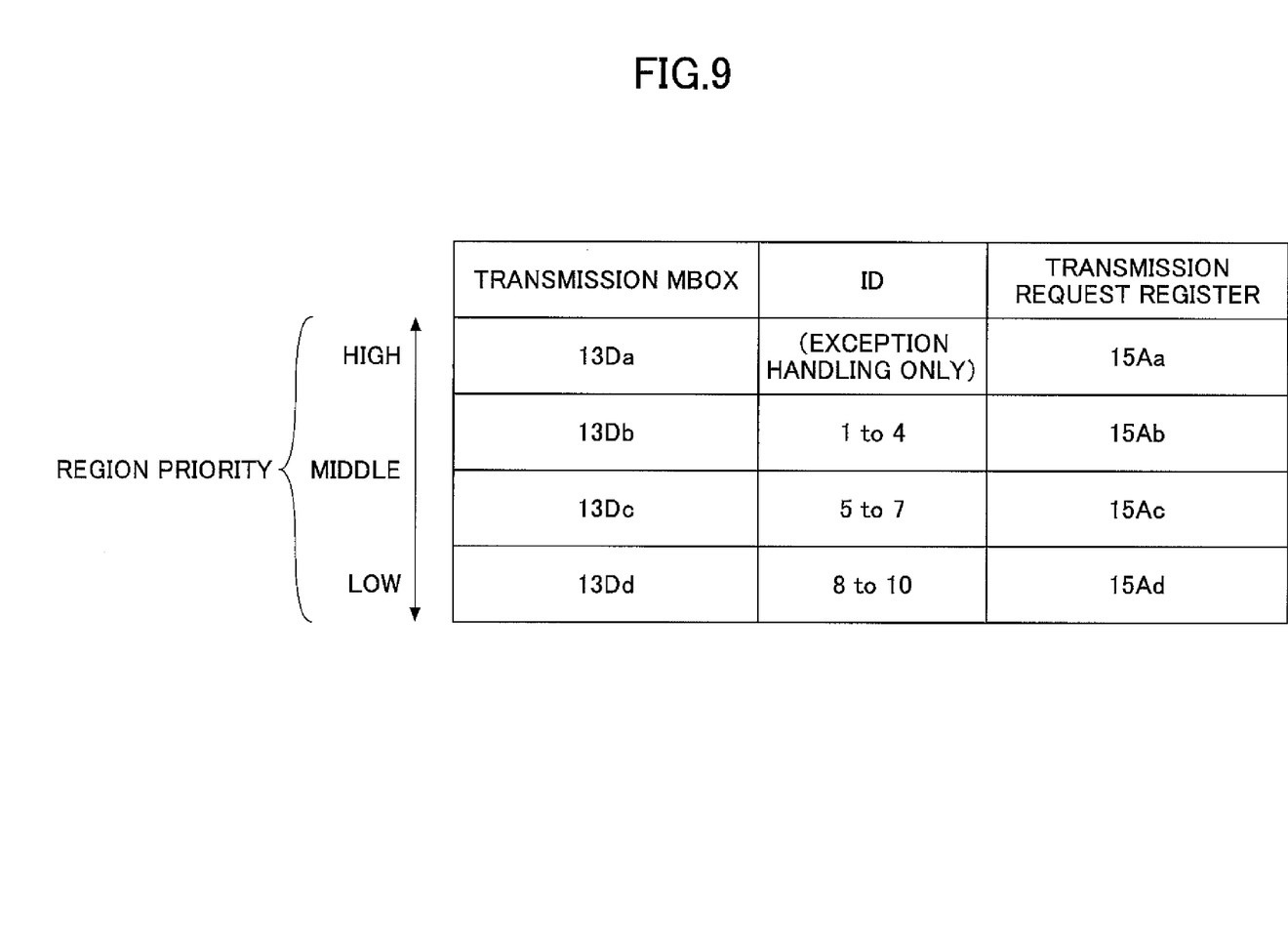
FIG. 9 illustrates an example of correspondence among transmission MBOXes, IDs, and transmission request registers when exception handling is executed.

For example, while following a principle to output data on a bus that has a higher priority relating to communication arbitration, if there is data kept stored in a transmission MBOX without being output on the bus for a certain period of time (referred to as the "wait-time-expired data" below), an attempt may be made for the data to be output on the bus with a highest priority regardless of the ID. In this case, a transmission MBOX may be set that is dedicated for such exception handling, to which the wait-time-expired data is moved from a transmission MBOX where the data has been stored initially. FIG. 9 illustrates an example of correspondence among transmission MBOXes, IDs, and transmission request registers when exception handling is executed. The communication middleware 12B monitors time that has passed since data has been stored in a transmission MBOX. When detecting generation of wait-time-expired data, the communication middleware 12B issues a command to the CAN driver 12C to move the wait-time-expired data into the transmission MBOX 13Da in FIG. 9. The CAN driver 12C moves the wait-time-expired data into the transmission MBOX 13Da, and at the same time, clears the flag to zero in the transmission request register corresponding to the transmission MBOX where the wait-time-expired data has been stored initially, and sets the flag to "1" in the transmission request register 15Aa corresponding to the transmission MBOX 13Da. Note that this process may not be implemented by moving the data between the transmission MBOXs, but by changing a flag in the CAN controller 15, or the like.

Figure 10:
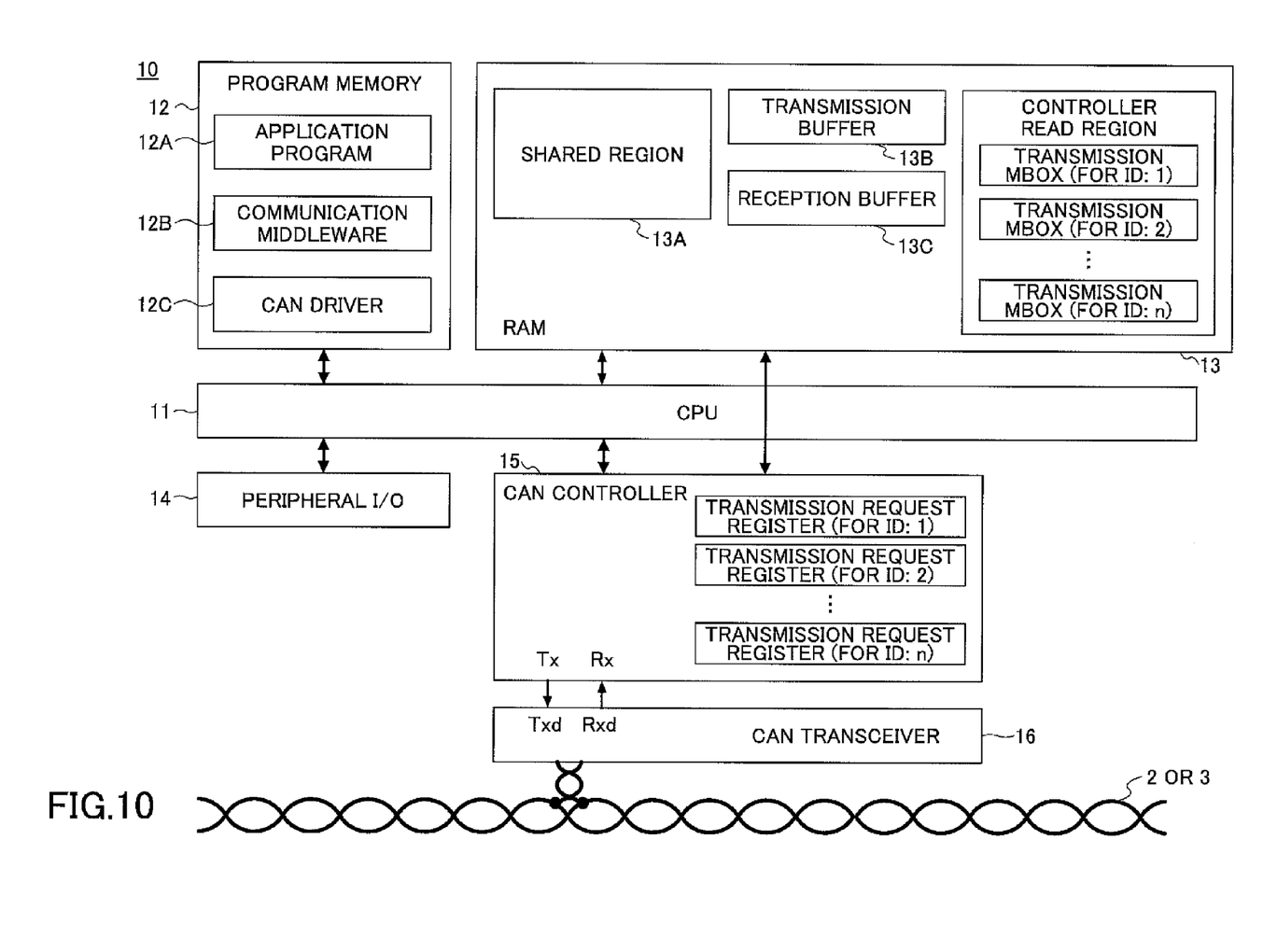
FIG. 10 illustrates a configuration example of an ECU 10 where transmission MBOXes are set corresponding to all IDs.

Also, in the above embodiments, although three transmission MBOXes are set (four if a transmission MBOX dedicated for exception handling is set) as an example, transmission MBOXs may be set, for example, corresponding to all IDs (1, 2, . . . n). FIG. 10 illustrates a configuration example of an ECU 10 where transmission MBOXes are set corresponding to all IDs. The configuration illustrated in FIG. 10 may further include a transmission MBOX dedicated for exception handling, and a corresponding transmission request register.

INDUSTRIAL USABILITY

The present invention can be used for the computer manufacturing industry, the computer software industry, the manufacturing industry of various systems using computers, and the like.

The present application is based on and claims the benefit of priority of Japanese Priority Application No. 2012-172697 filed on Aug. 3, 2012, with the Japanese Patent Office, the entire contents of which are hereby incorporated by reference.

DESCRIPTION OF REFERENCE SYMBOLS

1 network system
2, 3 bus
10 ECU
11 CPU
12 program memory
12A application program
12B communication middleware
12C CAN driver
13 RAM
13A shared region
13B transmission buffer
13C reception buffer
13D controller read region
13Da, 13Db, 13Dc, . . . transmission MBOX
14 peripheral I/O
15 CAN controller
15Aa, 15Ab, 15Ac, . . . transmission control register
16 CAN transceiver
50 gateway apparatus

The invention claimed is:

1. A data transmission apparatus, comprising:
a memory having a plurality of areas that are configured to store data having priorities ranging from a high priority to a low priority: and
a processor programmed to function as:
an output unit configured to: (i) output data on a bus, the data having priority information represented by an integer included in one of a plurality of predetermined consecutive data priority ranges from a high priority range to a low priority range, and (ii) determine whether to output the data on the bus based on a result of a communication arbitration performed with competing data to be output on the bus; and
a distribution unit configured to write the data having a transmission request received, in one of the areas in the memory depending on priority information attached to the data, such that the data having higher priority information is written in one of the areas having the priority that corresponds to the data priority range: wherein
the output unit prioritizes outputting the data on the bus, the data being stored in the one of the areas having highest priority, among the data stored in the plurality of areas.

2. The data transmission apparatus, as claimed in claim 1, further comprising:
a plurality of flag memories configured to be provided corresponding to the plurality of areas set in the memory, respectively,
wherein the distribution unit sets a flag in one of the flag memories corresponding to one of the areas when data having the transmission request received is written in the one of the areas in the memory, wherein the output unit prioritizes outputting the data stored in the one of the areas having the higher priority, among the areas in the memory corresponding to the flag memory having the flag set.

3. The data transmission apparatus, as claimed in claim 1, wherein the output unit outputs, with a highest priority, data not having been output on the bus for a certain period of time, among the data stored in any one of the plurality of areas, regardless of the priority of the area storing the data.

4. The data transmission apparatus, as claimed in claim 3, wherein
the plurality of areas in the memory includes an exceptional area dedicated for storing data not having been output on the bus for the certain period of time,
the distribution unit determines the data not having been output on the bus, and moves the determined data to the exceptional area from a corresponding one of the other areas,
the output unit outputs the data stored in the exceptional area with the highest priority on the bus.

5. A data transmission method, executed by a data transmission apparatus configured to: (i) output data on a bus, the data having priority information represented by an integer included in one of a plurality of predetermined consecutive data priority ranges from a high priority range to a low priority range and (ii) determine whether to output the data on the bus based on a result of a communication arbitration performed with competing data to be output on the bus, the data transmission apparatus including a memory having a plurality of areas that are configured to store data having priorities ranging from a high priority to a low priority, the method comprising:

writing the data having a transmission request received, in one of the plurality of areas in the memory depending on priority information attached to the data, such that the data having higher priority information is written in one of the areas having the priority that corresponds to the data priority range; and
prioritizing outputting the data on the bus, the data being stored in the one of the areas having highest priority, among the data stored in the plurality of areas.

6. A non-transitory computer-readable recording medium having a program stored therein for causing a data transmission apparatus to execute a process to: (i) output data on a bus, the data having priority information represented by an integer included in one of a plurality of predetermined consecutive data priority ranges from a high priority range to a low priority range, and (ii) determine whether to output the data on the bus based on a result of a communication arbitration performed with competing data to be output on the bus, the data transmission apparatus including a memory having a plurality of areas that are configured to store data having priorities ranging from a high priority to a low priority, the process comprising:
writing the data having a transmission request received, in one of the plurality of areas in the memory depending on priority information attached to the data, such that the data having higher priority information is written in one of the areas having the priority that corresponds to the data priority range; and
prioritizing outputting the data on the bus, the data being stored in the one of the areas having highest priority, among the data stored in the plurality of areas.

* * * * *